July 1, 1969   J. B. VOGT   3,452,706
TEMPERATURE INDICATING DEVICE
Filed July 25, 1968   Sheet 1 of 2
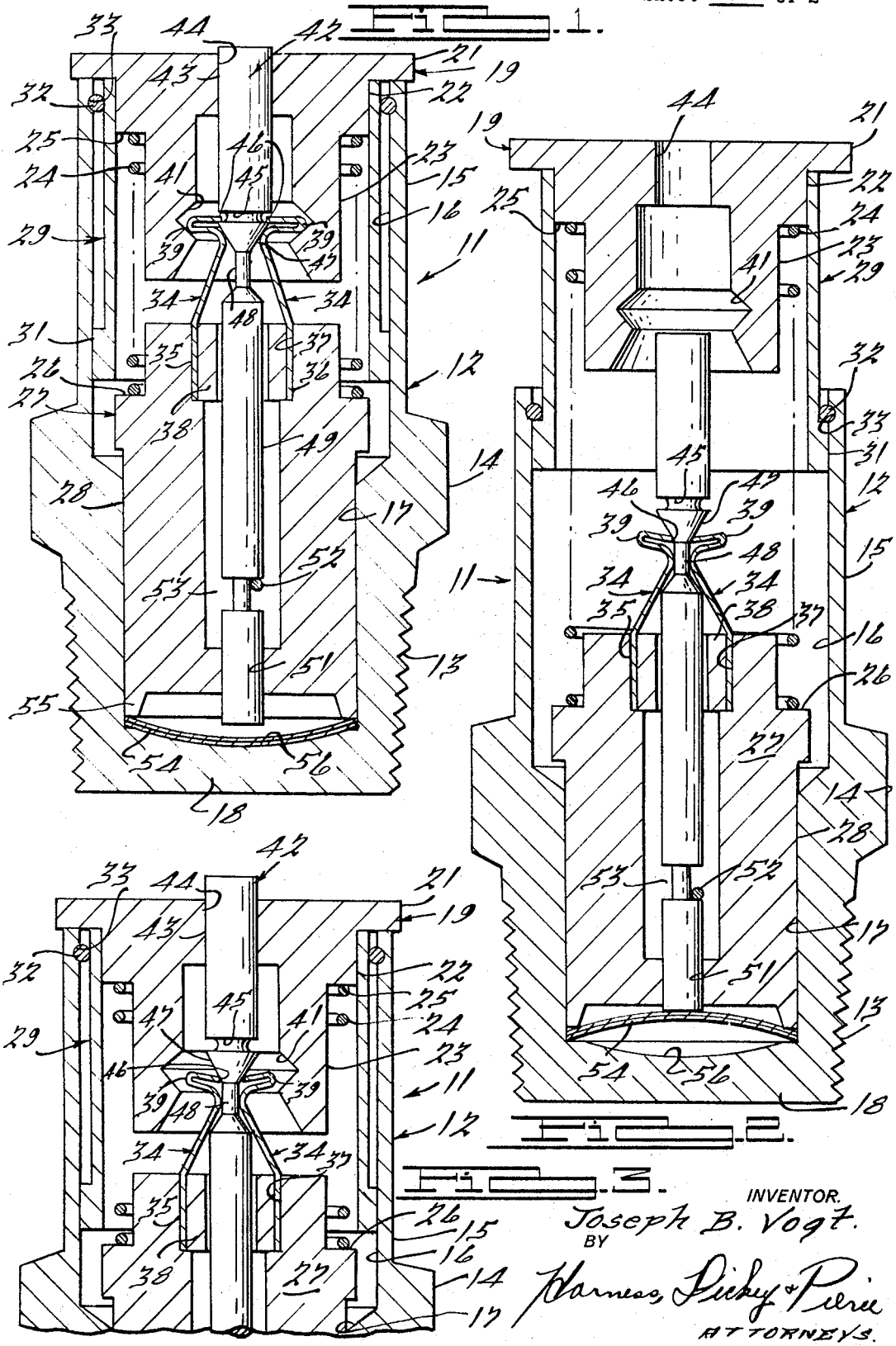
INVENTOR.
Joseph B. Vogt.
BY
Harness, Dickey & Pierce
ATTORNEYS.

INVENTOR.
Joseph B. Vogt.

United States Patent Office 3,452,706
Patented July 1, 1969

1

3,452,706
TEMPERATURE INDICATING DEVICE
Joseph B. Vogt, 1304 Grayton Road,
Grosse Pointe, Mich. 48236
Continuation-in-part of application Ser. No. 489,365,
Sept. 22, 1965. This application July 25, 1968, Ser.
No. 756,700
Int. Cl. G08b 17/00, 17/04; G01k 3/00
U.S. Cl. 116—102                                    7 Claims

ABSTRACT OF THE DISCLOSURE

This application discloses embodiments of temperature indicating devices that give a visual indication of a specific or abnormal temperature condition. Each of the indicating devices includes a supporting body and an indicator plunger that is movable with respect to the body and indicates a specific temperature condition in an extreme position. A temperature responsive latching mechanism is provided for retaining the plunger in its retracted position and which is released upon the sensing of a specific temperature condition whereby a biasing member may move the plunger to the aforenoted extreme position. The device is constructed in such a way so that the latching mechanism may be conveniently reset.

Related application

This application is a continuation-in-part of my co-pending application of the same title, Ser. No. 489,365, filed Sept. 22, 1965, now abandoned.

Background of the invention

This invention relates to a temperature indicating device and more particularly to a device that gives a visual indication of a specific or abnormal temperature condition.

In many applications, it is desirable to provide some form of temperature indicator that will indicate when a specific temperature is reached, which temperature deviates from a normal temperature. Such temperature indicators may indicate either over or under temperature conditions. One such application for a temperature indicator of this type is in the monitoring of steam traps, particularly those traps that are remotely located in building truss areas or other areas where routine examination of the trap operation presents a problem. The problems of steam wastage, condensate pump failure, excess space temperature and corrosion in condensate piping systems due to steam trap malfunction has long been a problem. In complex and extensive systems involving numerous trap installations, the problem of determining the exact point of malfunction is a risky and time consuming operation since each suspected trap must be closely inspected. Frequently these traps are installed in remote, dark or overhead positions in truss areas of the building.

It is, therefore, a principal object of this invention to provide a temperature indicating device that will give a visual indication of an abnormal temperature condition and which will be visible from a remote point.

Although various types of visual temperature indicators have been proposed, the proposed devices have had several disadvantages. For example, many of the proposed devices permit only a single temperature indication; that is, they cannot be reset for reuse. If the devices afford

2 some structure for permitting resetting, they have been prone to false readings due to vibration, such as water hammer or other similar shocks in the system. Additionally, many of the proposed indicating devices have consisted of a number of components which must be separately mounted. Other disadvantages of the proposed devices is that they do not lend themselves to remote viewing nor do they lend themselves to convenient modification to sense different temperature conditions.

It is another object of this invention to provide a temperature indicating device suitable for remote viewing and treated to enhance the viewing properties.

It is a further object of this invention to provide an improved low cost temperature indicating device having interchangeable thermal elements such as bi-metallic members, all calibrated for the specific operating temperatures of the particular system in which the devices are to be installed.

It is another object of the invention to provide a temperature indicating device which may be reset and reused.

It is a still further object of the invention to provide a temperature indicating device that is shock resistant and will not give false readings.

It is yet another object of the invention to provide a temperature indicating device that is self-contained and which may be mounted to sense temperature variations in any of a variety of manners.

Brief summary of the invention

A temperature indicator embodying this invention is particularly adapted to sense a predetermined variation from a normal temperature. Such a temperature indicating device is comprised of a generally cylindrical body having a cylindrical bore that opens through one end of the body and which terminates adjacent the other end. An indicator plunger is supported for reciprocation within the open end of the bore from a normal temperature position to an extended temperature indicating position with a spring engaging the plunger for urging the indicator plunger to its temperature indicating position. A circumferential groove is formed within the indicator plunger and is engaged by a spring clip for retaining the indicator plunger in its normal temperature position. A reset plunger is adapted to engage the spring clip to retain the spring clip in engagement with the indicator plunger and temperature responsive means are provided for moving the reset plunger free of the spring clip to release the spring clip and permit the indicator plunger to be moved to its temperature indicating position by the spring.

Brief description of the drawings

FIGURE 1 is a cross-sectional view showing a first embodiment of a temperature indicating device according to this invention and depicting the indicating device in its normal temperature or set position;

FIGURE 2 is a cross-sectional view, in part similar to FIGURE 1, showing the temperature indicating device in its tripped or temperature indicating position.

FIGURE 3 is a partial cross-sectional view, in part similar to FIGURES 1 and 2, showing the temperature indicating device in a position to be reset.

*Detailed description of the preferred embodiments*

Figure 4:
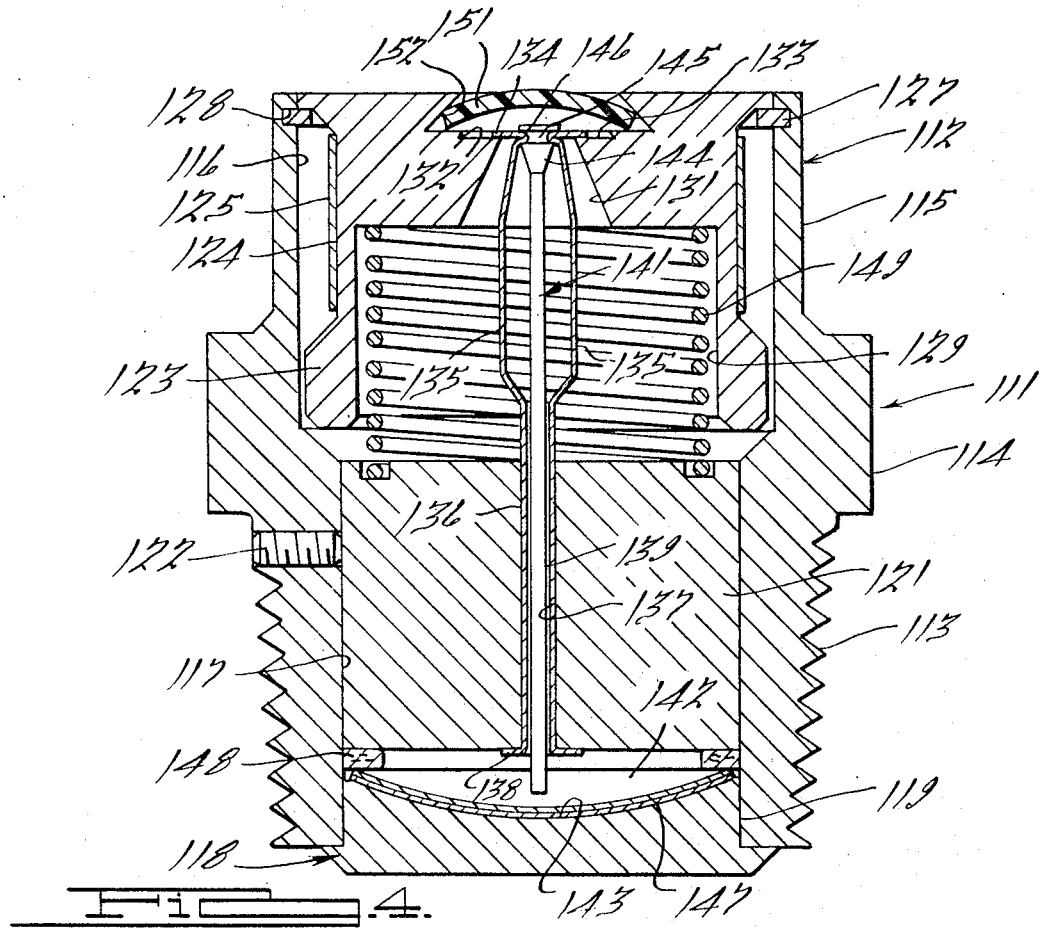
FIGURE 4 is a cross-sectional view showing a second embodiment of a temperature indicating device and depicts the temperature indicating device in its normal temperature or set position._

Referring now specifically to the embodiment of FIGURES 1 through 3, a temperature indicating device is identified generally by the reference numeral 11. The temperature indicating device 11 is comprised of a generally cylindrical body 12 having a screw threaded lower portion 13, a square or hexagonal intermediate portion 14 and a cylindrical upper portion 15. The screw threaded portion 13 is adapted to be fitted into a tapped hole with the lower end of the body 12 being exposed to the temperature being sensed. The portion 14 is formed so that it is adapted to be gripped by a wrench or other similar tool to facilitate the insertion of the indicator 11 into the temperature sensing position. The temperature indicating device 11 is particularly suited to monitor the temperature at the steam trap discharge and the threaded portion 13 can be readily connected to the condensate piping serving the trap. Of course, the device 11 may be used to sense the temperature conditions and may be mounted for its temperature sensing function in other ways, as will become more apparent.

An upper cylindrical bore 16 is formed coaxially in the body 12 and joins a smaller diameter bore 17 at its lower end. The bore 16 opens through the upper end of the cylindrical portion 15 and the bore 17 terminates adjacent the lower end of the threaded portion 13 and is closed by an end 18 of the body 12.

An indicator plunger, identified generally by the reference numeral 19, has an enlarged head portion 21 that is adapted to be engaged with the upper end of the body 12 and is larger in diameter than the portion 15. A first, smaller diameter cylindrical portion 22 depends from the head portion 21 and is adapted to extend into the bore 16 (FIGURES 1 and 3) with the head portion 21 abutting the upper end of the body 12. The cylindrical portion 22 terminates at its lower end in a smaller diameter cylindrical portion 23. A coil spring 24 encircles the cylindrical portion 23 and one of its ends engages a shoulder 25 formed between the cylindrical portions 22 and 23. The opposite end of the coil spring 24 engages a shoulder 26 formed in a turret, indicated generally by the reference numeral 27. The turret 27 has a cylindrical portion 28 which is positioned within the bore 17 and is held in position by set screws, or other suitable means, through body 12 so as to make the parts readily replaceable.

An indicating sleeve 29 of generally hollow cylindrical shape is press fitted at its upper end around the cylindrical portion 22 of the indicator plunger 19. The lower end of the indicating sleeve 29 has an enlarged diameter portion 31 of generally cylindrical shape that is slidably received with the bore 16. A locating ring 32 is received with a groove 33 formed at the upper end of the bore 16 to restrain the indicating sleeve 29 and plunger 19 within the body portion 12.

The coil spring 24 normally urges the indicator plunger 19 and indicating sleeve 29 to an extended temperature indicating position (FIGURE 2). Latching means comprised of a plurality of circumferentially spaced spring catches, indicated generally by the reference numeral 34, are provided to restrain the indicator plunger 19 and indicating sleeve 29 in a normal temperature position (FIGURE 1). The spring catches 34 have lower ends 35 that are received in a bore 37 formed at the upper end of the turret 27. A locking ring 38 retains the spring catch ends 35 in position with respect to the turret 27. The upper ends of the spring catches 35 are formed with outwardly extending locking portions 39 that are adapted to be received in an annular recess 41 formed coaxially in the indicator plunger cylindrical portion 23. when the locking portions 39 of the spring clips 34 are received in the recess 41 and held in this position, the indicator plunger 19 will be locked in the normal temperature position against the action of the coil spring 24. The spring clips 34 have sufficient resilience, however, so that the coil spring 24 can overcome the locking action between the spring clips 34 and indicator plunger 19 and urge the indicator plunger 19 to its extended temperature indicating position.

A reset plunger, indicated generally by the reference numeral 42, is provided to restrain the spring clips 34 in engagement with the indicator plunger 19. The reset plunger 42 has a cylindrical portion 43 slidably supported within a cylindrical bore 44 formed coaxially at the upper end of the indicator plunger 19 above the recess 41. A circumferential groove 45 is formed at the base of the cylindrical portion 43 and inwardly extending ends 46 of the spring clips 34 are adapted to engage the circumferential groove 45. A generally conical shaped portion 47 is formed adjacent the lower end of the groove 45 and meets a small diameter cylindrical portion 48 adjacent its lower end. An elongated larger diameter cylindrical portion 49 extends downwardly from the smaller diameter portion 48 and is slidably supported at its lower end within a bore 51 formed at the lower end of the turret 27.

A restraining pin 52 extends transversely to the turret 27 and is supported thereby. The restraining pin 52 extends into an elongated circumferential groove 53 formed at the lower end of the cylindrical portion 49 of the reset plunger 42 to limit the degree of movement of the reset plunger 42 with respect to the turret 27 and supporting body 12.

A bi-metallic snap action dish-shaped member 54 is positioned at the lower end of the bore 17 in the body 12 and may be engaged around its periphery by a downwardly extending flange 55 of the turret 27. As is a well known characteristic of such elements, the bi-metallic member 54 has a concave shape at a given temperature and moves to a convex shape when the temperature reaches another value. This deformation in shape may occur when the member is either heated or cooled depending upon the materials which form the opposite faces of the washer. In the disclosed embodiment, the temperature indicating device 11 is adapted to sense an over-temperature condition and the bi-metallic member 54 is concave at normal temperatures and achieves a convex condition at elevated temperatures. It is to be understood, however, that the device 11 may indicate an under-temperature condition merely through inversion of the bi-metallic member 54. The end portion 18 of the body 12 may be formed from a segmented spherical surface 56 that is complementary to the bi-metallic member 54 in one of its extreme positions (FIGURE 1). In this position of the lower end of the reset plunger portion 49 is spaced upwardly from the bi-metallic member 54 (FIGURE 1).

OPERATION OF EMBODIMENT OF FIGURES 1 THROUGH 3

In the reset or normal temperature indicating position (FIGURE 1) the spring clip locking portions 39 engage the plunger recess 41 and are precluded from radial inward movement by the engagement of the ends 46 with the circumferential groove 45. The groove 45 has sufficient diameter to preclude disengagement of the locking portions 39 from the groove 41. The temperature indicating device 11 is positioned with the body end 18 located to sense temperature and indicate a specific or abnormal temperature, which, as has been noted in the described embodiment is an over-temperature condition. As long as the temperature of the area being sensed is below the temperature which is to be indicated, the bi-metallic member 54 will remain in its concave shape, as shown in FIGURE 1. If the temperature increases, the bi-metallic member 54 will eventually reach a temperature at which it will snap or move over-center into the convex position (FIGURE 2). When this occurs, the reset plunger 42 will be driven upwardly, with the spring clip ends 46 moving initially over the enlarged end of the conical portion 47. The spring clip ends 46 are biased inwardly and follow the conical portion 46 of the reset plunger 42 as it is driven upwardly until the spring clip ends 46 register with the smaller diameter portion 48 of the reset plunger 42. In this position the spring clip ends 46 are moved inwardly, through the spring clips 34 own resiliency, to permit the locking portion 39 to move clear of recess 41. The reset plunger 42 will be held by clip ends 46 in contact with the smaller diameter portion 48 following the upward movement of reset plunger 42. As has been previously noted, the coil spring 24 has sufficient force to overcome the spring clips 34 when they are not held in position by the reset plunger 42. The indicator plunger 19 and indicating sleeve 29 will then be urged outwardly from the bore 16 until the indicating sleeve portion 31 engages the locating ring 32 (FIGURE 2). The indicating sleeve 29 and extended indicator plunger 19 then provide a visual indiction that an over-temperature condition exists. The surface of the temperature indicating sleeve 29 may be coated with a luminous paint to draw attention to this fact. Alternatively, the indicator plunger 19 or indicating sleeve 29 may trigger some other indicating mechanism such as an alarm bell or the like.

After the over-temperature condition has been rectified and following the bi-metallic member 54 repositioning to normal position, the indicator device 11 may be reset by first depressing the indicator plunger 19 into the position shown in FIGURE 3. The reset plunger 42 then becomes available and is then also depressed to urge the spring clip locking portion 39 into engagement with recess 41. The conical surface 47 assists in the resetting function. In the event that the abnormal temperature condition of the system has not been corrected, the deformed bi-metallic member 54 will not permit the reset plunger 42 to position to the point of engagement of clip ends 46 in the groove 45 thereby making it impossible to reset the device under normal conditions.

It should be readily apparent that the construction of the spring clips 34 and their coaction with the plunger 42 insures that vibrations due to water hammer or other causes will not cause the spring clips to move free from their engagement with the indicator plunger 19 and thus give a false temperature indication.

EMBODIMENT OF FIGURE 4

Another embodiment of temperature indicating device constructed according to this invention is identified generally by the reference numeral 111 in FIGURE 4. The device 111 is similar in many respects to the device 11 disclosed in FIGURES 1 through 3 and in some regards offers an improved construction. The device 111 is comprised of a generally cylindrical body assembly 112 formed from a first generally cylindrical member having a screw threaded portion 113 which terminates adjacent a square or hexagonal intermediate portion 114. A cylindrical portion 115 is formed on the other side of the hexagonal intermediate portion 114. The screw threaded portion 113 is adapted to be fitted into a tapped hole or otherwise affords mounting for the device 111. The portion 114 permits a wrench or other similar tool to be employed to turn the device 111 and tighten the threads 113.

The cylindrical member of the body assembly 112 is formed with a stepped cylindrical bore comprised of a first larger diameter portion 116 that opens through the upper end of the body assembly 112 and a second smaller diameter section 117 formed adjacent the lower end of the cylindrical member. A closure plug 118 has a pilot portion 119 that is received in the bore 117 and which is affixed, as by soldering, to the cylindrical member to complete the body assembly 112. Preferably, the closure plug 118 is formed from copper or some other material having a high coefficient of thermal conductivity for a reason which will become more apparent as this description proceeds.

A generally cylindrical turret 121 is received in the bore section 117 and is held in place by one or more set screws 122 that are threaded into tapped holes formed at circumferentially spaced locations in the body assembly 112.

A sliding indicator plunger 123 is supported for reciprocation within the bore section 116 between a retracted or normal temperature indicating position as shown in FIGURE 4 and an extended or temperature indicating position in a manner similar to the previously described embodiment. The indicator plunger 123 has a section 124 between its ends of a reduced diameter which section may be covered with a tape 125 offering a high light reflectivity or alternatively, this area may be painted with a high reflectivity paint. A retaining ring 127 is received in a circumferential groove 128 formed at the upper periphery of the body assembly 112 and between the opposite ends of the reduced diameter section 124 of the indicator plunger 123 for limiting the extreme movement of the indicator plunger in each of its positions and for retaining the indicator plunger 123 relative to the body assembly 112.

The indicator plunger 123 is formed with a bore 129 that extends upwardly from its lower end, which bore terminates adjacent a frustoconical section 131 which, in turn, terminates adjacent a circumferential groove 132. The groove 132 forms a shoulder 133 that is engaged by outwardly extending locking portions 134 of spring catches 135. The spring catches 135 are formed from extensions of a stainless steel tube 136 that is received in a bore 137 of the turret 121. The tube 136 is held in place relative to the turret 121 by an outwardly flared end 138 which may, if desired, additionally be soldered or otherwise affixed to the turret 121.

The tube 136 supports an elongated shank 139 of a reset plunger, indicated generally by the reference numeral 141. The shank 139 extends from a cavity 142 formed between the lower end of the turret 121 and a concave surface 143 of the closure plug 118 upwardly through the turret 121 and terminates in a conical portion 144 in which a circumferential groove 145 is formed. The groove 145 receives inwardly extending projections 146 of the spring catches 135 for a reason which will become more apparent as this description proceeds.

A bi-metallic dish-shaped member 147 is received in the cavity 142 and may be held in place around its outer periphery by a fiber or other insulating washer 148 that bears against the outer periphery of the turret 121. As with the previously described embodiment, the bimetallic member 147 may have any desired temperature characteristic. That is, the member 147 moves from its normal concave shape as shown in FIGURE 4 to a convex shape when its temperature deviates from a predetermined norm.

OPERATION OF EMBODIMENT OF FIGURE 4

The embodiment shown in FIGURE 4 operates substantially the same as the embodiment shown in FIGURES 1 through 3. In its cocked or normal temperature position (FIGURE 4) the coaction of the reset plunger 141 with the spring catches 135 maintains the locking ends 134 in engagement with the shoulder 133 and holds the indicator plunger 123 in its normal temperature position. When the bimetallic member 147 reaches the predetermined temperature at which it snaps from its concave to its convex condition, the reset plunger 141 will be driven upwardly. The spring catches 135, which are inwardly biased, follow the conical portion 144 of the reset plunger 141 and move out of engagement with the plunger shoulder 133. A coil spring 149 received in the plunger bore 129 and bearing against the upper end of the turret 121 then forces the indicator plunger 123 upwardly. The indicator plunger 123 will then be in an extended temperature indicating position as in the previously described embodiment. Also, as in the previously described embodiment, the indicator plunger 123 may be reset when the temperature of the bi-metallic member 147 again approaches its normal temperature. At this time, the indicator plunger 123 may be forced downwardly. The reset plunger 141 is then reset by applying a pressure to a transparent heat resistant cover 151 that is received in a recess 152 formed in the upper end of the indicator plunger 123. The cover 151 may be deformed to urge the reset plunger 141 downwardly so that the spring catch portions 146 again are received in the groove 145.

It should be readily apparent that, as in the previously described embodiment, the construction of the device 111 is such that bi-metallic member 147 may be easily replaced by a bi-metallic member having different temperature characteristics to indicate other temperature conditions. In addition, as in the previously described embodiment, the unit is such that it may be reused. In addition, in this embodiment the bi-metallic member 147 is insulated to some extent by the washer 148 so that the heat transmitted to the disk by the closure plug 118 will not be dissipated through the other portion of the device 111. The unit, however, has sufficient mass so that false readings will not be given by brief temperature fluctuations.

Although only one bimetallic member has been described in conjunction with the embodiments of FIGURES 1 through 3 and FIGURE 4, it is possible to employ a multitude of such members all similarly calibrated. Such bimetallic members having low differential temperature characteristics also have correspondingly low deforming forces and if used singly might not have sufficient force to operate the reset plunger. By using a multitude of such members, the total force generated can be multiplied to operate the unit even though only a low temperature differential is being indicated.

EMBODIMENT OF FIGURE 5

Figure 5:
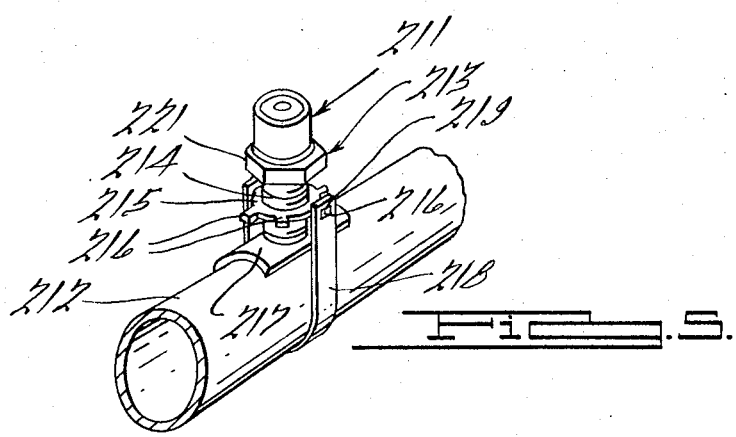
FIGURE 5 is a perspective view showing the surface mounting of one of the temperature indicating devices shown in FIGURES 1 through 3 or FIGURE 4.

As has been noted in describing each of the previous embodiments, the body assembly is formed with a threaded portion so that the device may be inserted into a tapped opening in a conduit. The devices, however, may be readily adapted for surface mounting, for example in the manner shown in FIGURE 5.

In this illustrative embodiment, a temperature indicating device constructed according to the embodiments of either FIGURES 1 through 3 of FIGURE 4 is identified generally by the reference numeral 211. The device 211 is adapted to sense an abnormal temperature condition in a conduit 212 and is surface mounted adjacent the outer periphery of the conduit 212 in the manner now to be described. As in each of the described embodiments, the device 211 includes a body assembly 213 having a male threaded lower end 214. A nut 215 having outwardly extending projections 216 is threaded onto the portion 214. The lower end of the device 211 is engaged with a saddle 217 that conforms to the surface of the conduit 212 and which is formed from a high heat conductive material such as copper, aluminum or the like. In addition, adjacent mating surfaces may be coated with a material for improving heat transmission. A sheet metal strap 218 encircles the conduit 212 and is formed with rectangular apertures 219 that receive the projection 216 of the nut 215. The strap 218 is tensioned by applying a wrench or similar tool to the hexagonal portion 221 of the body assembly 213 and rotating this portion relative to the nut 215. It should be readily apparent that this construction permits the device 211 to sense the temperature in the conduit 212 without necessitating the formation of a tapped opening in the conduit 212. Other manners of surface mounting the described temperature indicating devices will, of course, become apparent to those skilled in the art.

What is claimed is:

1. A temperature indicator comprising a generally cylindrical body, a cylindrical bore formed in said body and opening through one end thereof, said bore terminating adjacent the other end of said body and being closed thereby, an indicator plunger supported for reciprocation within the open end of said bore from a normal temperature position within said bore to an extended temperature change indicating position, spring means contained within said body portion and engaging said indicator plunger and said body for urging said indicator plunger to its temperature change indicating position, a circumferential groove formed coaxially within said indicator plunger, a spring clip supported at one end thereof said body, a portion of the other end of said spring clip being adapted to engage said circumferential groove for retaining said indicator plunger in its normal temperature position, a reset plunger adapted to engage said spring clip and retain said spring clip portion in engagement with said indicator plunger, and temperature responsive means for moving said reset plunger free of said spring clip for releasing said spring clip whereby said spring may urge said indicator plunger to its temperature change indicating position.

2. A temperature indicator as set forth in claim 1 wherein the temperature responsive means comprises at least one bimetallic dish-shaped member.

3. A temperature indicator as set forth in claim 1 wherein the periphery of the indicator plunger is coated with a light reflective substance to facilitate visual indication.

4. A temperature indicator as set forth in claim 1 wherein the spring means comprises a coil spring encircling the indicator plunger.

5. A temperature indicator as set forth in claim 1 further including a turret detachably supported within the cylindrical bore of the body adjacent the temperature responsive means, the spring clip being carried by said turret and the reset plunger being slidably supported by said turret.

6. A temperature indicator comprising a cylindrical body, a cylindrical bore formed in said body and opening through one end thereof, said bore terminating short of the other end of said body, an indicator plunger supported for reciprocation within the open end of said bore from a normal temperature position to an extended temperature indicating position, coil spring means encircling said indicator plunger and engaging said indicator plunger and said body for urging said indicator plunger to its extended temperature indicating position, a bore extending coaxially within said indicator plunger, a circumferential groove formed around said indicator plunger bore, spring clip means supported by said body at one end thereof and adapted to extend into said indicator plunger bore at the other end thereof, said spring clip means having a portion adapted to engage said circumferential groove for retaining said indicator plunger in its normal temperature position, a reset plunger supported for reciprocation within said indicator plunger bore and extending to a point adjacent said other end of said body, said reset plunger being movable from a first reset position to an extended trip position, said reset plunger having a surface formed thereon adapted to engage the other end of said spring clip for retaining said spring clip portion within said circumferential groove and retaining said indicator plunger in its normal temperature position when in its reset position, and at least one bi-metallic dish-shaped member supported within said body adjacent said other body end, said member being movable in response to temperature variations from a first position to a second position engaging said reset plunger and moving said reset plunger to its trip position, said surface of said indicator plunger being free of said other spring clip end in said trip position for movement of said indicator plunger to its temperature indicating position.

7. A temperature indicator as set forth in claim 6 wherein the periphery of the indicator plunger is coated with a light reflecting substance to facilitate visual indication.

References Cited

UNITED STATES PATENTS

| | | | |
|---|---|---|---|
| 2,046,186 | 6/1936 | Saul | 116—114.5 |
| 2,207,601 | 7/1940 | Shakespeare et al. | 73—378.3 |
| 2,362,424 | 11/1944 | Walsh | 116—114.5 |
| 2,521,469 | 9/1950 | Marks | 116—102 |
| 2,532,510 | 12/1950 | Nelson | 116—114.5 |
| 3,045,826 | 7/1962 | Howard et al. | 210—90 |
| 3,080,972 | 3/1963 | Smith | 210—90 |
| 3,117,550 | 1/1964 | Cole | 116—70 |
| 3,128,743 | 4/1964 | Whiting | 116—70 |
| 3,140,690 | 7/1964 | Siebel | 116—70 |
| 3,156,119 | 11/1964 | Darnell | 73—419 |
| 3,183,882 | 5/1965 | Preece | 116—70 |
| 3,200,787 | 8/1965 | Darnell | 116—70 |
| 3,220,375 | 11/1965 | Gruber et al. | 116—70 |
| 3,232,266 | 1/1966 | Levesque | 116—70 |
| 3,237,454 | 3/1966 | Gray | 73—419 |

LOUIS J. CAPOZI, *Primary Examiner.*

U.S. Cl. X.R.

73—378.3